United States Patent [19]

Memmel

[11] Patent Number: 4,713,592
[45] Date of Patent: Dec. 15, 1987

[54] APPARATUS FOR SENSING THE POSITION OF A STRUCTURAL MEMBER

[75] Inventor: Lawrence C. Memmel, Mequon, Wis.

[73] Assignee: Super Tool and Mfg. Corporation, Brookfield, Wis.

[21] Appl. No.: 800,136

[22] Filed: Nov. 20, 1985

[51] Int. Cl.$^4$ .................. G05B 23/02; B23B 39/06; B23G 1/00

[52] U.S. Cl. .................. 318/565; 318/661; 408/13; 408/16; 83/368; 72/12

[58] Field of Search .................. 318/565, 661; 83/368, 83/560; 74/9, 17, 8, 21, 10, 31, 32, 33, 34, 35, 419, 421; 73/859, 432 R; 364/560, 561, 562, 563, 474, 475, 478; 33/328; 29/26 R, 26 A, 561; 72/12, 17; 408/13, 16, 62, 31, 69

[56] References Cited

U.S. PATENT DOCUMENTS

| | | | |
|---|---|---|---|
| 2,956,454 | 10/1960 | Hansen | 408/13 |
| 3,065,781 | 11/1962 | Muller | 72/34 |
| 3,192,751 | 7/1965 | Baker | 72/35 |
| 3,200,508 | 8/1965 | Harper | 72/35 |
| 3,730,635 | 5/1973 | Orendi | 408/13 |
| 3,839,944 | 10/1974 | Swift | 72/21 |
| 3,900,720 | 8/1975 | Konersmann | 364/500 |
| 4,061,064 | 12/1977 | Kindgren | 408/13 |
| 4,198,181 | 4/1980 | Smelser | 408/16 |
| 4,232,540 | 11/1980 | Cain | 72/17 |
| 4,268,195 | 5/1981 | Regenliecht | 408/16 |
| 4,407,614 | 10/1983 | Muhr | 408/13 |
| 4,417,834 | 11/1983 | Jagers | 408/16 |
| 4,528,756 | 7/1985 | Ichihara | 72/17 |
| 4,594,869 | 6/1986 | Matsuoka | 72/21 |

Primary Examiner—William M. Shoop, Jr.
Assistant Examiner—Patrick C. Keane
Attorney, Agent, or Firm—Andrus, Sceales, Starke & Sawall

[57] ABSTRACT

An apparatus for sensing the location of a structural member on which a working operation is to be performed. The apparatus includes a probe that is connected to a rack and is mounted for movement between an inoperative position and an operative position, where the probe will be in engagement with the structural member. The rack is carried by a piston which is slideable within a cylinder and by introducing fluid pressure into one end of the cylinder, the rack will be extended to thereby move the probe from the inoperative to the operative position. Engaged with the rack is a pinion and linear movement of the rack will rotate the pinion and rotation of the pinion acts through a resolver to generate a signal indicating the precise position of the structural member.

3 Claims, 3 Drawing Figures

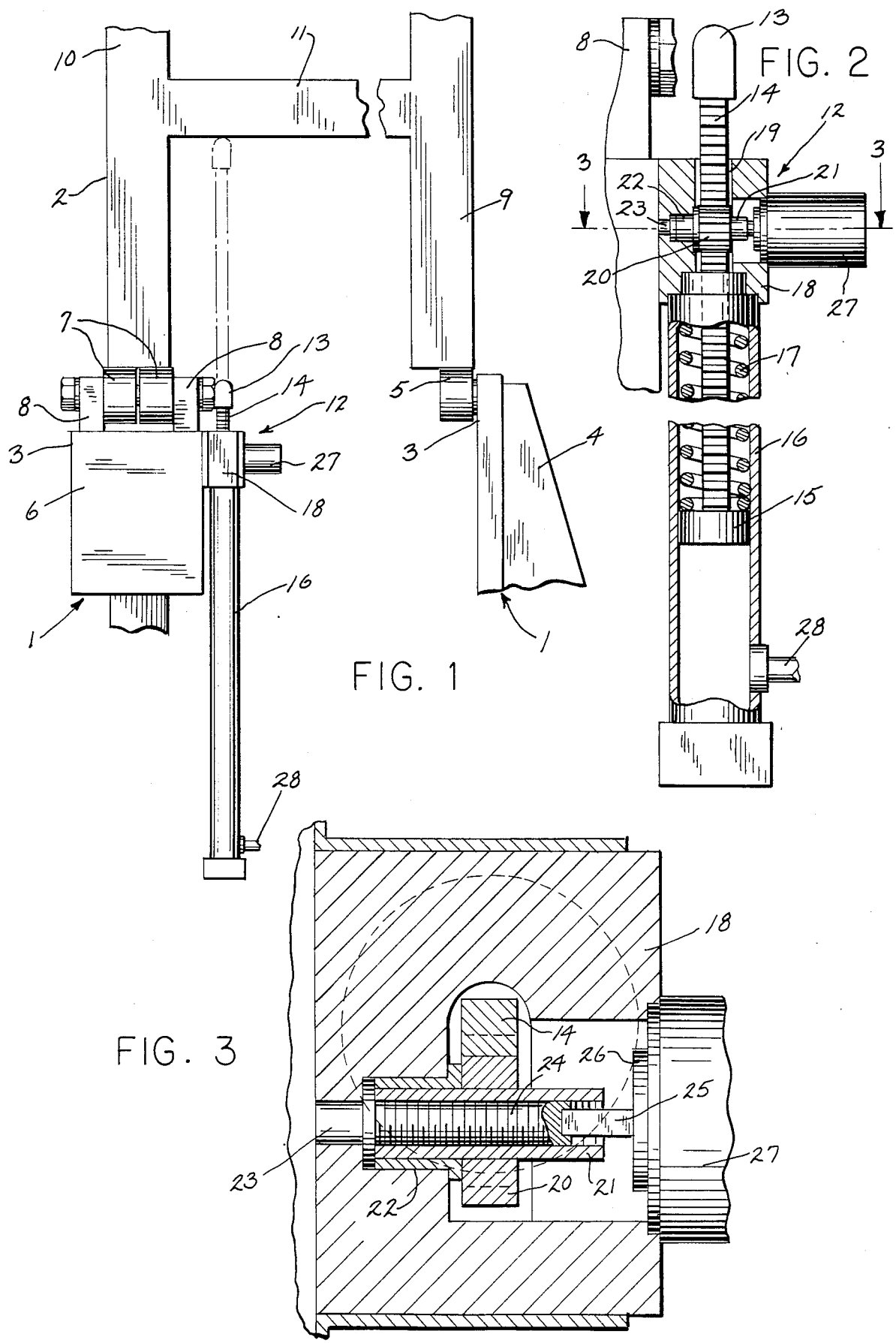

APPARATUS FOR SENSING THE POSITION OF A STRUCTURAL MEMBER

BACKGROUND OF THE INVENTION

In a multiple head drilling apparatus, the workpiece, such as a wide flange beam, is fed into the machine on guide rollers. Upper and side assemblies each carry spindle blocks on which are mounted the drill heads. The spindle blocks are moved relative to the respective assemblies to position the drill heads at the proper location for drilling holes in both the flanges and web of the beam.

Recently multiple head drilling machines have been programed through electronic controls in which the beam is advanced and the drill heads are actuated through computerized controls.

When dealing with long beams, and particularly beams having a web of substantial depth, the web may not be entirely planar and may have irregularities in the contour. When drilling holes in the web and flanges, it is necessary to accurately establish the position of the web so that the holes can be drilled at the precise location. In situations where the web is not uniformly planar, the irregularities in the web can cause inaccurate locating of the holes to be drilled in the side flanges.

SUMMARY OF THE INVENTION

The invention is directed to an apparatus for precisely sensing the location of a structural member, such as the web of a wide flange beam, in order that the drill heads of a multiple head drilling machine and precisely drill holes in the flange of the beam.

In accordance with the invention, the sensing apparatus includes a probe which is mounted on the outer end of a rack, while the inner end of the rack is connected to a piston that is slidable in a cylinder. The probe is biased to an inoperative position by a compression spring which is located within the cylinder, and the probe can be moved from the inoperative position to the operative position where it is in engagement with the web of the beam by fluid pressure acting on the piston in the cylinder.

Movement of the probe from the inoperative to the operative position is measured through a pinion which is engaged with the rack so that linear movement of the rack will rotate the pinion. The pinion in turn is operably connected to a resolver so that rotation of the pinion will generated an electric signal to establish the precise location of the undersurface of the web of the beam.

With the sensing mechanism of the invention, the position of the beam is precisely determined even though the web may contain irregularities and is not uniformly planar. This results in the holes being more precisely drilled in the flanges of the beam and eliminates the possiblity of rejects and scrapage.

Other objects and advantages will appear in the course of the following description.

DESCRIPTION OF THE DRAWINGS

The drawings illustrate the best mode presently contemplated of carrying out the invention.

In the drawings

FIG. 1 is an end view of the guide mechanism for a multiple head drilling machine utilizing the sensing apparatus of the invention, with the probe being shown in the inoperative position;

FIG. 2 is an enlarged longitudinal section of the sensing apparatus;

FIG. 3 is a section taken along line 3—3 of FIG. 2.

DESCRIPTION OF THE ILLUSTRATED EMBODIMENT

The apparatus is directed to a sensing apparatus which will precisely establish the position of the web of a wide flange beam so that the holes can be accurately located and drilled in the side flanges of the beam.

The apparatus includes a frame or supporting structure 1 and a workpiece, such a wide flange beam 2, is mounted for movement or advancement on a guide mechanism 3 mounted on frame 1. More particularly, guide mechanism 3 includes a series of brackets 4 mounted in spaced relation on frame 1 and a guide roller 5 is journalled on the upper end of each bracket 4. A beam 6 is mounted on frame 1 in spaced relation to the brackets 4 and a series of pairs of rollers 7 are journalled on beam 6 through mounting brackets 8.

As best illustrated in FIG. 1, beam 2 includes a pair of side flanges 9 and 10 which are connected together by a web 11. One of the flanges 9 is supported for movement on rollers 5, while the opposite flange 10 is mounted for travel on the rollers 7. The guide mechanism for advancing or moving the beam in itself is conventional and forms no part of the present invention.

In accordance with the invention, a sensing mechanism 12 is incorporated to precisely establish the position of the web 11 of beam 2. Sensing mechanism 12 includes a probe 13 having a generally rounded tip which is mounted on the outer end of a rack 14. As best shown in FIG. 2, the inner end of the rack is connected to a piston 15 which is slideable within cylinder 16 connected to beam 6.

To bias the probe to an inoperative position, a compression spring 17 is interposed between piston 15 and the lower surface of head upper 18. The force of spring 17 will urge the piston downwardly to move the probe to an inoperative or inner position.

As best shown in FIG. 2, the upper head 18 is provided with passage 19 through which the rack 14 extends so that the rack can move freely within the head.

Engaged with the rack is a pinion 20 which is mounted within upper head 18. As shown in FIG. 3, pinion 20 is secured to a sleeve 21 which projects outwardly from opposite ends of the pinion. One end of the sleeve 21 is journalled within bushing 22, which is mounted to the head 18 through a plug 23.

Threaded within the axial opening in sleeve 21 is a shaft 24, and a bar 25 having a generally rectangular cross section is mounted within an opening in one end of shaft 24 and extends outwardly beyond the corresponding end of sleeve 21. Bar 25 is received within a slot in the shaft 26 of resolver 27. This connection between the pinion and the resolver provides a certain degree of flexibility, as opposed to a rigid coupling so that irregularities in movement of the pinion will not be transmitted directly to the resolver.

A suitable cover, not shown, can be used to enclose the resolver.

In operation, beam 2 is fed into the machine on the guide mechanism 3 and at this time, the probe 13 is in its lower or inoperative position. With the beam properly positioned in the machine, the probe is extended by introducing fluid into the lower end of cylinder 16 through line 28, causing the rack 14 to extend within the cylinder and moving the probe 13 into contact with the surface of the web 11 of beam 2. Linear movement of the rack 14 causes rotation of the pinion 20 and the resolver generates a signal in proportion to the amount of rotation of the pinion, to thereby establish the precise position of the web 11. The signal is fed into the electronic circuitry to thereby move the drill heads, not shown, to the precise datum line of the web as determined by the probe.

After the position of the web has been determined, fluid pressure in line 29 is withdrawn and spring 17 will move the probe back to its inoperative position.

While the above description has illustrated the sensing mechanism as used to sense the position of the web of a wide flange beam, it is contemplated that the sensing mechanism can be used to sense the position of any structural member on which a working operation is to be performed.

Various modes of carrying out the invention are contemplated as being within the scope of the following claims particularly pointing out and distinctly claiming the subject matter which is regarded as the invention.

I claim:

1. An apparatus for sensing the location of a structural member on which a working operation is to be performed, comprising conveyor means to support and convey a structural member, a housing connected to said conveyor means and having a passage extending therethrough, a cylinder connected to the housing, a piston slidable within the cylinder, a rack connected to the piston and extending from one end of said cylinder and extending through said passage, a probe mounted on the outer end of the rack, a pinion disposed within the passage and engageable with the rack, means for journalling the pinion for rotation within said passage and including a rotatable shaft, resolver means mounted on the housing for generating a signal in accordance with rotation, connecting means connecting said shaft to said resolver means to transmit rotation of said shaft to said resolver means, and means for moving said piston within said cylinder to extend said rack and move said probe into engagement with said structural mebmer, extension of said rack acting to rotate said pinion and correspondingly rotate said resolver means to establish a signal indicating the position of said structural member.

2. The apparatus of claim 1, and including biasing means for moving said piston in the opposite direction in said cylinder.

3. The apparatus of claim 1, wherein said connecting means is constructed and arranged to provide limited axial movement between said shaft and said resolver means.

* * * * *